United States Patent
Barriga et al.

(10) Patent No.: US 8,935,763 B2
(45) Date of Patent: Jan. 13, 2015

(54) SYSTEM AND METHOD OF USER AUTHENTICATION IN WIRELESS COMMUNICATION NETWORKS

(75) Inventors: Luis Barriga, Bandhagen (SE); David Castellanos Zamora, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 705 days.

(21) Appl. No.: 12/867,592

(22) PCT Filed: Feb. 15, 2008

(86) PCT No.: PCT/SE2008/050184
§ 371 (c)(1),
(2), (4) Date: Aug. 13, 2010

(87) PCT Pub. No.: WO2009/102248
PCT Pub. Date: Aug. 20, 2009

(65) Prior Publication Data
US 2010/0333173 A1 Dec. 30, 2010

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *H04K 1/00* | (2006.01) | |
| *H04W 12/06* | (2009.01) | |
| *H04L 9/08* | (2006.01) | |
| *H04L 9/32* | (2006.01) | |

(52) U.S. Cl.
CPC ............ *H04W 12/06* (2013.01); *H04L 9/0844* (2013.01); *H04L 9/321* (2013.01); *H04L 63/06* (2013.01); *H04L 63/083* (2013.01); *H04L 2209/76* (2013.01); *H04L 2209/80* (2013.01)
USPC .................... 726/5; 380/270; 380/247

(58) Field of Classification Search
USPC ........... 726/2–7, 9, 11–15; 380/247–250, 270
See application file for complete search history.

(56) References Cited

U.S. PATENT DOCUMENTS

| | | | | |
|---|---|---|---|---|
| 2003/0204608 | A1* | 10/2003 | Isomaki | 709/229 |
| 2005/0143065 | A1* | 6/2005 | Pathan et al. | 455/432.1 |
| 2008/0307518 | A1* | 12/2008 | Holtmanns et al. | 726/12 |

FOREIGN PATENT DOCUMENTS

| | | |
|---|---|---|
| EP | 1853032 A1 | 11/2007 |
| WO | 2007/085779 A1 | 8/2007 |

OTHER PUBLICATIONS

Messmer, M. et al. "Flexible and Strong Authentication for Next Generation Services." 11th International Conference on Intelligence in Service Delivery Networks, Bordeaux, France, Oct. 8-11, 2007. Available online at: http://www.icin.biz/files/programmes/Session1B-3.pdf.

* cited by examiner

*Primary Examiner* — Philip Chea
*Assistant Examiner* — Trong Nguyen
(74) *Attorney, Agent, or Firm* — Coats & Bennett, P.L.L.C.

(57) ABSTRACT

Methods and systems taught herein provide for authentication information for authenticating a user terminal to be shared between a network entity that supports IMS-AKA authentication of the user terminal and a network entity that supports GBA-AKA authentication of the user terminal. Sharing authentication information between these entities allows all or part of the authentication information generated for IMS-AKA authentication of the user terminal to be used subsequently for GBA-AKA authentication of the user terminal, or vice versa.

22 Claims, 10 Drawing Sheets

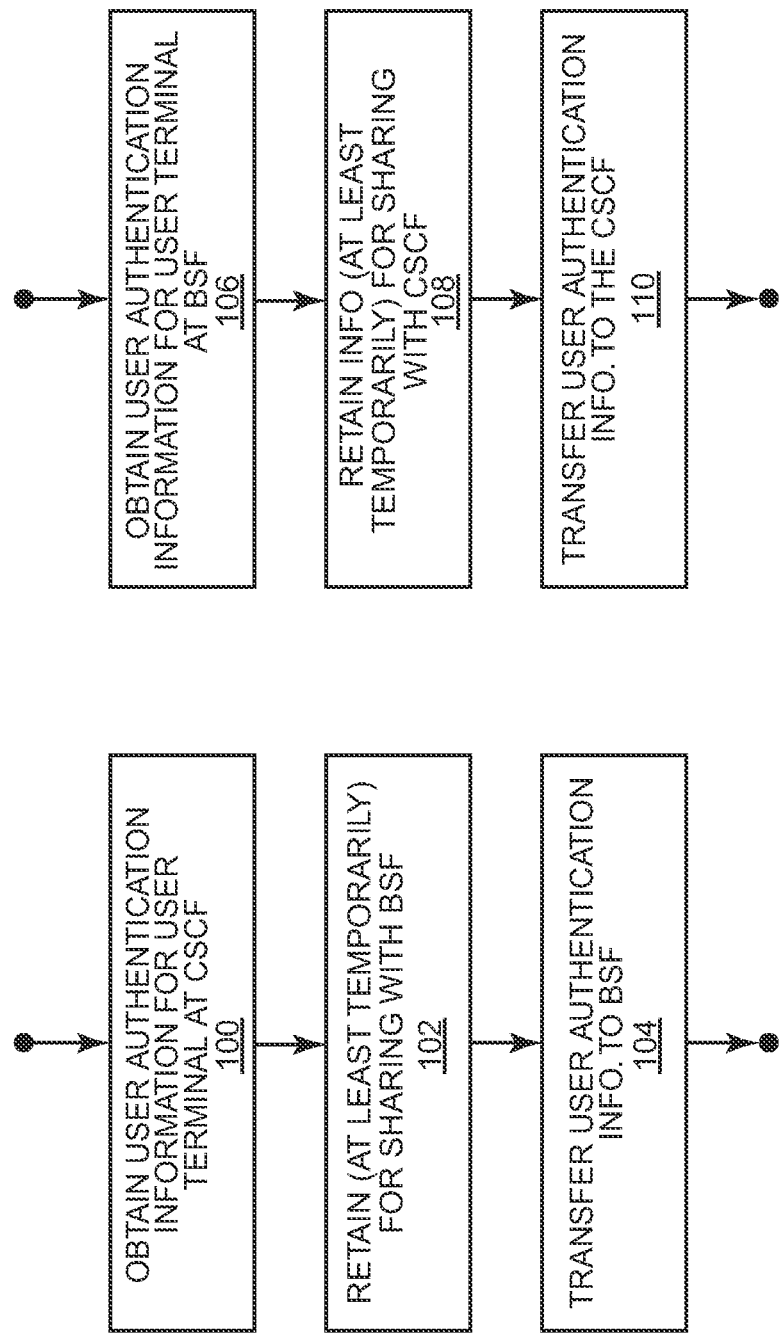

SYSTEM AND METHOD OF USER AUTHENTICATION IN WIRELESS COMMUNICATION NETWORKS

TECHNICAL FIELD

The present invention generally relates to authenticating users for wireless communication networks, and particularly relates to sharing user authentication information between IMS and GBA based user authentications.

BACKGROUND

Existing and developing wireless communication networks offer increasing ranges and types of communication services to users. In almost all instances, users must be authenticated or otherwise verified before granting access to services. The particular authentication required often depends on the type of service being accessed. For example, services available through an Internet Protocol Multimedia Core Network Subsystem (referred to as "IMS" or "IMS network") generally require IMS registration of the user terminal attempting to access such services. This registration includes an Authentication and Key Agreement (AKA) security procedure, which involves Session Initiation Protocol (SIP) signaling between the user terminal and the IMS network.

More particularly, an IMS network uses two identities for a given user terminal. The first identity is an IP Multimedia PUblic key identity (IMPU), and the second identity is an IP Multimedia Private Identity (IMPI). The IMPI may, for example, be derived from the user terminal's International Mobile Subscriber Identity (IMSI). The Third Generation Partnership Project (3GPP) standards make that method of key derivation mandatory, where IMPIs are formed using identity information from the Universal Subscriber Identity Modules (USIMs) implemented in user terminals.

Generally, a user terminal has one IMPI, but it may have a plurality of IMPUs. The IMPUS are, however, correlated to the IMPI. A Home Subscriber Server (HSS), for example, stores a list of IMPUs for each IMPI. For IMS registration, including IMS-AKA authentication, a Call Session Control Function (CSCF) communicates with the HSS to obtain an authentication vector. The user terminal communicates with the CSCF using a SIP-based AKA authentication protocol.

Other applications available outside of the IMS network services may require other authentication processing. For example, a number of applications require authentication based on the Generic Bootstrapping Architecture (GBA), which also uses AKA-based authentication (based on HTTP signaling). A Bootstrapping Server Function (BSF) contacts the terminal's HSS to obtain the AKA vector, and to obtain General User Security Settings (GUSS) for GBA-AKA authentication of the user terminal.

More particularly, GBA-based authentication first establishes a shared secret between the network and a user terminal by running a bootstrapping procedure. The shared secret is then used between Network Application Functions (NAFs) and the user terminal for authentication purposes, wherein the user terminal and a BSF mutually authenticate using the AKA protocol and agree on session keys that are afterwards applied between the user terminal and a NAF. Generally, the BSF restricts the applicability of the key material to a specific NAF by using a key derivation procedure. The key derivation procedure may be used for authenticating to multiple NAFs during the lifetime of the key material. Key lifetimes are set, for example, according to local policies implemented at the BSF.

Although the IMS-AKA authentication procedures and the GBA-AKA authentication procedures both rely on AKA-based authentication, they are conventionally done on separate and independent bases. For example, for the same user terminal, a CSCF contacts the HSS to obtain an AKA vector for authenticating the user terminal in the IMS security domain. Likewise, for the same terminal, a BSF likewise contacts the same HSS to obtain an AKA vector for authenticating the terminal in the GBA security domain. Thus, for the same user terminal, duplicate authentication information is generated and maintained.

SUMMARY

According to teachings presented herein, user authentication information for authenticating a user terminal is shared between a network entity that supports IMS-AKA authentication of the user terminal and a network entity that supports GBA-AKA authentication of the user terminal. Sharing authentication information between these entities allows all or part of the authentication information generated for IMS-AKA authentication of the user terminal to be used subsequently for GBA-AKA authentication of the user terminal, or vice versa.

For reference, "IMS-AKA" in an exemplary case refers to the Authentication and Key Agreement (AKA) security specifications for Internet Protocol Multimedia Core Network Subsystem (IMS), as promulgated by the Third Generation Partnership Project (3GPP). Similarly, "GBA-AKA" in an exemplary case refers to the AKA security specifications for Generic Bootstrapping Architecture (GBA) in the context of Generic Authentication Architecture (GAA), as promulgated by the 3GPP. Of course, the teachings herein extend to like-functioning entities and procedures for networks based on similar standards, and for networks based on evolutions of the relevant existing 3GPP standards.

In at least one embodiment, a method of reducing redundant authentication operations for a user terminal comprises sharing user authentication information between a Call Session Control Function (CSCF) used in IMS-AKA authentication of the user terminal and a Bootstrapping Server Function (BSF) used in GBA-AKA authentication of the user terminal. Sharing authentication information in at least one such embodiment comprises, for example, the CSCF obtaining an AKA vector from a Home Subscriber Server (HSS) during an IMS-AKA authentication of the user terminal, and transferring the AKA vector, or a derived AKA vector, from the CSCF to the BSF. That transfer allows the BSF to use the transferred AKA vector in a subsequent GBA-AKA authentication of the user terminal, rather than, for example, the BSF accessing the HSS for the generation of new AKA vector information to support the GBA-AKA authentication.

In one or more other embodiments, a CSCF for use in IMS-AKA authentication of a user terminal comprises a BSF interface operative to share user authentication information between the CSCF and a BSF, for use by the BSF in a GBA-AKA authentication of the user terminal. The authentication information shared between the CSCF and the BSF comprises, for example, an AKA vector, which the CSCF obtains from an HSS during an IMS-AKA authentication of the user terminal. Rather than coordinating with the HSS for generation of another AKA vector for GBA-AKA authentication of the user terminal, the BSF instead uses the AKA vector transferred to it from the CSCF, thereby eliminating or at least reducing redundancy between the IMS-AKA and the GBA-AKA authentication operations.

In still other embodiments, a BSF for use in GBA-AKA authentication of a user terminal comprises a CSCF interface operative to share user authentication information between the BSF and a CSCF that is used for IMS-AKA authentication of the user terminal. The shared authentication information may comprise an AKA vector. For example, the BSF may obtain an AKA vector from an HSS during a GBA-AKA authentication of the user terminal, and then transfer the AKA vector to the CSCF, for use by the CSCF in IMS-AKA authentication of the user terminal. The transfer thus obviates the need for the CSCF to obtain a new AKA vector from the HSS for IMS-AKA authentication.

In at least one such embodiment, the BSF is operative to act as a proxy for the HSS with regard to the CSCF. The CSCF thus contacts the BSF rather than the HSS, to obtain an AKA vector for an IMS-AKA authentication of the user terminal. The BSF is operative to obtain the AKA vector from the HSS and transfer it, or a derived AKA vector, to the CSCF for its use in the IMS-AKA authentication of the user terminal. Further, the BSF is operative to retain a copy of the AKA vector for its use in a GBA-AKA authentication of the user terminal. That retention saves the BSF from obtaining a separate AKA vector from the HSS for GBA-AKA authentication. The BSF may, as part of obtaining the AKA vector, obtain General User Security Settings (GUSS) for the user terminal, and use the AKA vector and the GUSS to bootstrap the GBA-AKA authentication of the user terminal.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a logic flow diagram for one embodiment of a method of sharing user authentication information for a given user terminal between a CSCF and a BSF, from the perspective of the CSCF.

FIG. 3 is a logic flow diagram for one embodiment of a method of sharing user authentication information for a given user terminal between a CSCF and a BSF, from the perspective of the BSF.

DETAILED DESCRIPTION

Figure 1:
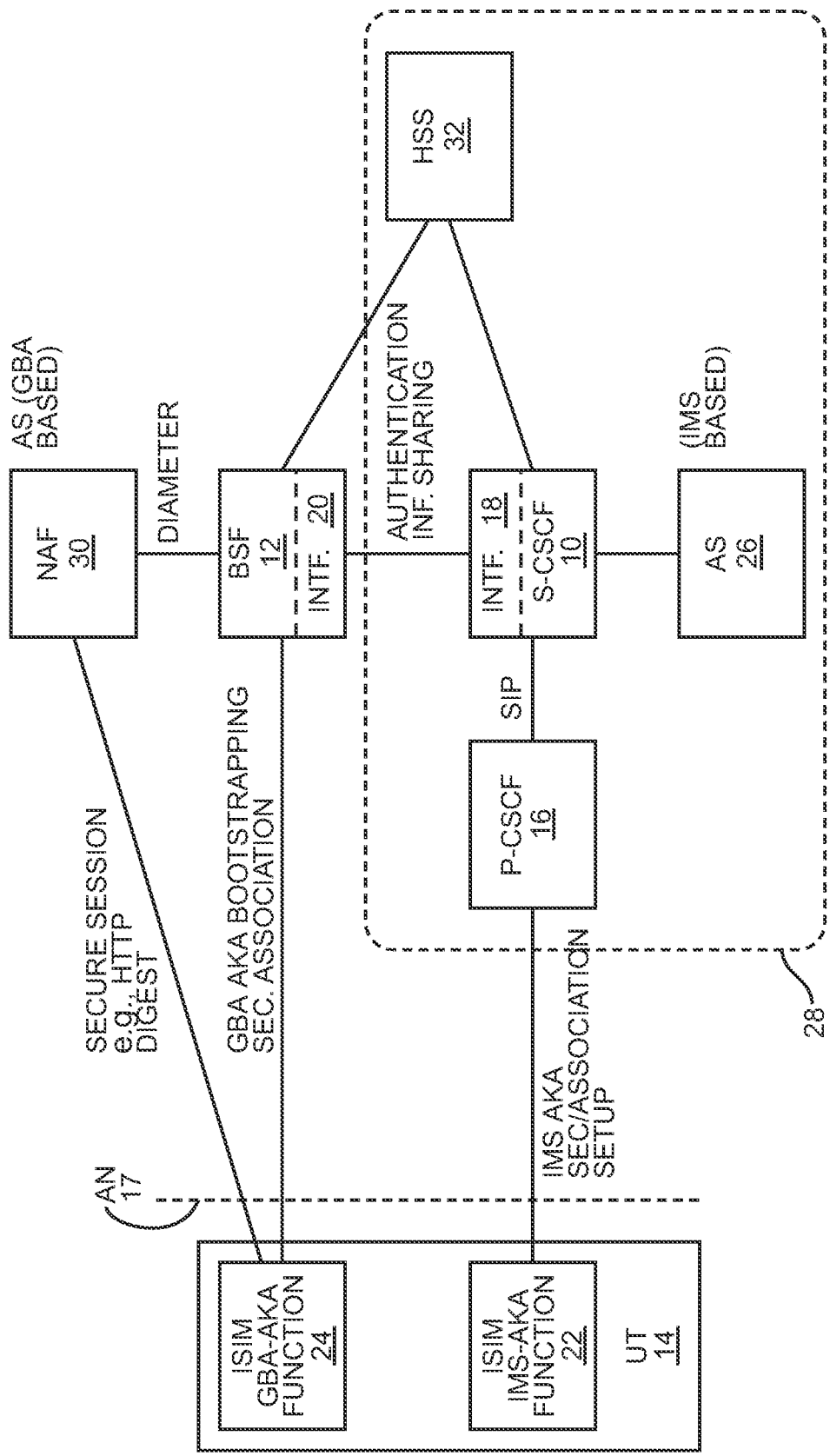
FIG. 1 is a diagram of one embodiment of a radio access network and one or more core networks, including a Call Session Control Function (CSCF) as an IMS-domain network entity and a Bootstrapping Server Function (BSF) as a GBA-domain network entity.

FIG. 1 is a block diagram of one embodiment of a Call Session Control Function (CSCF) 10 and a Bootstrapping Server Function (BSF) 12, which are operative to share user authentication information for IMS-AKA authentication of a user terminal (UT) 14, and for GBA-AKA authentication of the same user terminal 14. Sharing authentication information between these network entities allows all or part of the authentication information generated for IMS-AKA authentication of the user terminal 14 to be used for a GBA-AKA authentication of the same user terminal 14, and vice versa. Among other advantages, such sharing reduces or eliminates redundant authentication operations that otherwise would be carried out for independent IMS-AKA and GBA-AKA authentications of the user terminal 14.

Here, "IMS-AKA" denotes the Authentication and Key Agreement (AKA) procedure defined by the applicable Third Generation Partnership Project (3GPP) standards and specifications for user terminal authentication to an Internet Protocol Multimedia Core Network Subsystem (IMS), with modifications taught herein for authentication information sharing. 3GPP AKA achieves two purposes: a) mutual authentication between users and the network (using specific keys); and b) and key agreement, where additional keys are derived to be further used for integrity and confidentiality protection. The "authentication information" contemplated herein for sharing can include mutual authentication and key agreement information. Likewise, "GBA-AKA" denotes the AKA procedure defined for user terminal authentication in the Generic Bootstrapping Architecture (GBA), with modifications taught herein for authentication information sharing.

In the illustration the CSCF 10 is illustrated as the "S-CSCF 10," denoting its "serving" role as regards the user terminal 14. More particularly, by way of non-limiting example, the user terminal 14 communicatively couples to the S-CSCF 10 through a "proxy" CSCF, denoted as "P-CSCF 16" in the illustration. (The user terminal 14 may gain communication access wirelessly through essentially any type of radio access/core network 17.) The S-CSCF 10 includes a "Bootstrapping Server Function interface," which is referred to herein as "BSF interface 18." Correspondingly, the BSF 12 includes a "Call Session Control Function interface," which is referred to herein as "CSCF interface 20."

The respective interfaces 18 and 20 are operative to communicatively couple (directly or indirectly) the S-CSCF 10 to the BSF 12, for sharing user authentication information between the S-CSCF 10 and the BSF 12. Among other advantages, sharing user authentication information between these two entities reduces (and may eliminate) redundant authentication operations that would otherwise be carried out for performing both an IMS-AKA authentication of the user terminal 14 and a GBA-AKA authentication of the same user terminal 14.

To better understand this and other advantages of the disclosed example arrangement, it may be helpful to note that the user terminal 14 includes an IMS-AKA authentication function 22 and a GBA-AKA authentication function 24, both of which may be implemented via secure processing circuitry (hardware and/or software) carried on a Universal Integrated Circuit Card (UICC) or the like. The user terminal 14 uses, for example, its IMS-AKA authentication function 22 to authenticate itself for securely accessing one or more IMS applications available from an IMS-based application server, denoted as AS 26, which may be included in or otherwise accessible through an IMS network 28. By way of non-limiting examples, such applications include presence sensing and multimedia broadcasting.

One or more other applications may be available outside of or apart from the IMS network's services, but are accessible to the user terminal 14 via a Network Application Function (NAF) 30. The user terminal 14 uses its GBA-AKA authentication function 24 to authenticate itself for access to access the application(s) available through the NAF 30. That GBA-AKA authentication is supported by the BSF 12 and conventionally requires the BSF 12 to access a Home Subscriber Server (HSS) 32, to obtain user authentication information, e.g., an AKA vector, for authenticating the user terminal 14. Likewise, the previously described IMS-AKA authentication of the user terminal 14 conventionally requires the S-CSCF 10 to access the HSS 32, to obtain, e.g., an AKA vector for authenticating the user terminal 14.

Recognizing that IMS-AKA authentication procedures and the separate GBA-AKA authentication procedures both rely on the same underlying AKA authentication structure, and both rely on the generation of an AKA vector keyed to the user terminal 14, the teachings herein provide for sharing user authentication information between the S-CSCF 10 and the BSF 12, for, among other things, reducing the redundancy that conventionally arises in performing separate, independent IMS-AKA and GBA-AKA authentication procedures for the same user terminal 14.

As a non-limiting example, FIG. 2 illustrates processing logic that may be implemented at the S-CSCF 10, such as by configuring hardware and/or software based circuits at the S-CSCF 10. Processing "begins" with the assumption that an IMS-AKA authentication has been initiated or otherwise triggered for the user terminal 14, and the S-CSCF 10 thus obtains or otherwise generates user authentication information for the user terminal 14 (Block 100). For example, the S-CSCF 10 obtains an AKA vector from the user terminal's HSS 32.

Processing continues with the S-CSCF 10 retaining at least temporarily the user authentication information (Block 102), which may be all or a selected portion of the information obtained by the S-CSCF 10 for carrying out the IMS-AKA authentication of the user terminal 14. Processing continues with the S-CSCF 10 transferring the user authentication information to the BSF 12 (Block 104). That is, the S-CSCF 10 sends, via its BSF interface 18, at least a portion of the authentication data generated for the IMS-AKA authentication of the user terminal 14 to the BSF 12, for use by the BSF 12 in GBA-AKA authentication of the user terminal 14. Doing so allows the BSF 12 to "reuse" all or a portion of the transferred authentication information to support the subsequent GBA-AKA authentication of the user terminal 14.

Blocks 106, 108, and 110 in FIG. 3 stand as a corresponding, non-limiting example of sharing user authentication information, but shown from the perspective of the BSF 12. That is, it is assumed that a GBA-AKA authentication is triggered first, and that the BSF 12 obtains authentication information for the user terminal 14 in support of carrying out that GBA-AKA authentication (Block 106), retains at least temporarily the authentication information for the user terminal 14 (Block 108), and transfers that authentication information to the S-CSCF 10 (Block 110), for its reuse in supporting IMS-AKA authentication of the user terminal 14. The illustrated processing logic can be implemented at the BSF 12 by appropriately configuring hardware and/or software based circuits.

Figure 4:
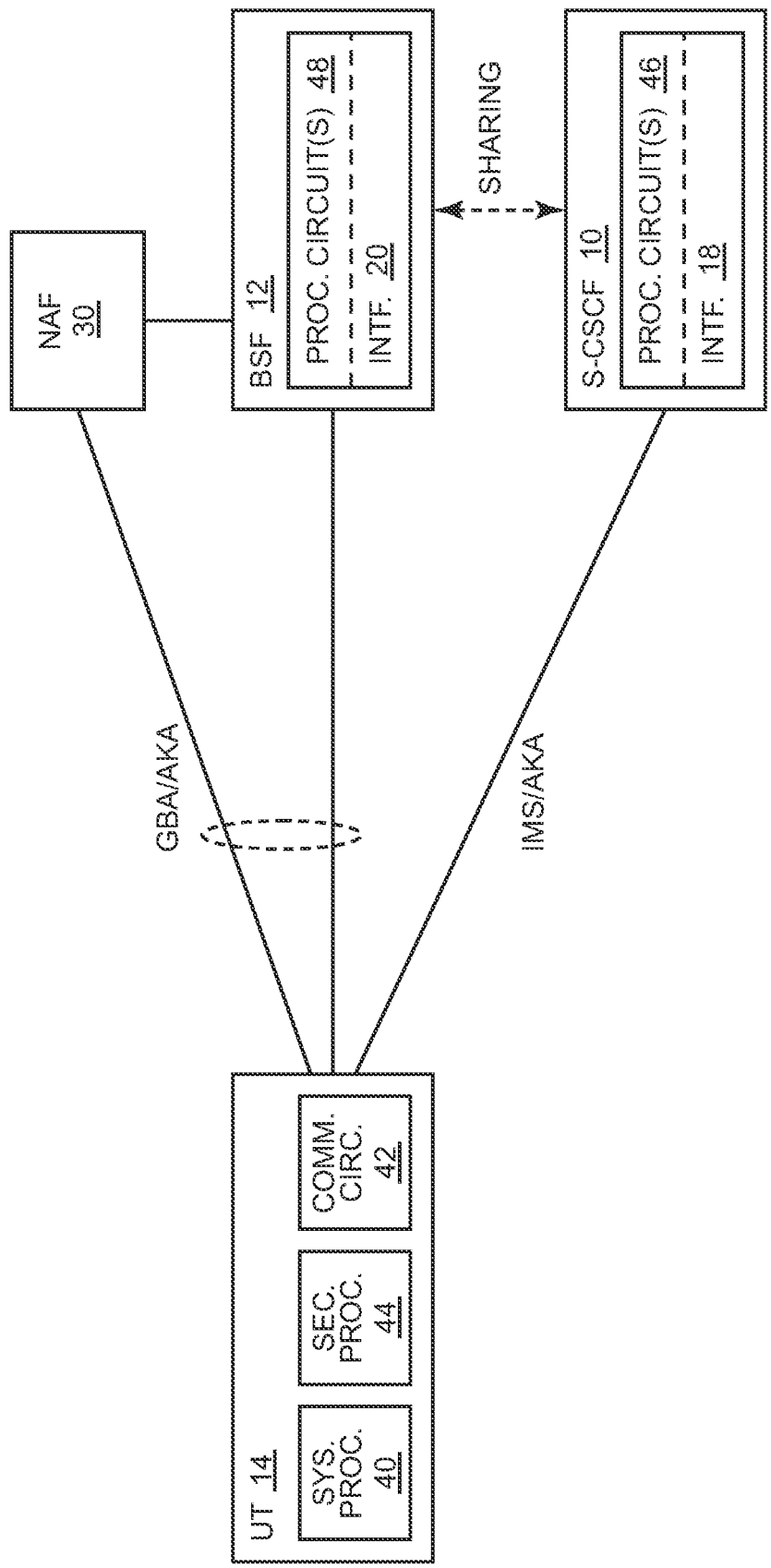
FIG. 4 is a block diagram of example circuit implementations for a user terminal, a CSCF, and a BSF, and includes example details for interfaces between the CSCF and the BSF, for sharing user authentication information.

On that point, FIG. 4 illustrates example, non-limiting implementations of the user terminal 14, the S-CSCF 10, and the BSF 12. Those skilled in the art will appreciate that these illustrations are simplified as appropriate for understanding the teachings herein.

First, the illustrated embodiment of the user terminal 14 comprises system processing circuits 40, e.g., one or more microprocessor-based circuits, communication circuits 42, e.g., cellular and/or other radio transceiver circuits, and security processing circuits 44, e.g., a UICC-based secure domain processing environment with secure memory, secret storage, terminal identification information, etc. Those skilled in the art should appreciate that the term "user terminal" is given broad construction herein and encompasses, by way of example rather than limitation, cellular radiotelephones, wireless pagers, PDAs, modem/network cards, and essentially any other type of communication module or device.

Next, the illustrated embodiment of the S-CSCF 10 comprises one or more processing circuits 46, which include or are associated with the BSF interface 18. These circuits can be implemented in hardware or software, or any combination thereof. In one embodiment, the S-CSCF 10 is made operative to support the authentication information sharing described and claimed herein based on provisioning or otherwise configuring the S-CSCF 10 with stored program instructions for execution by one or more included microprocessor circuits.

Similarly, the illustrated embodiment of the BSF 12 comprises one or more processing circuits 48, which include or are associated with the CSCF interface 20. These circuits can be implemented in hardware or software, or any combination thereof. In one embodiment, the BSF 12 is made operative to support the authentication information sharing described and claimed herein based on provisioning or otherwise configuring the BSF 12 with stored program instructions for execution by one or more included microprocessor circuits.

Figure 5:
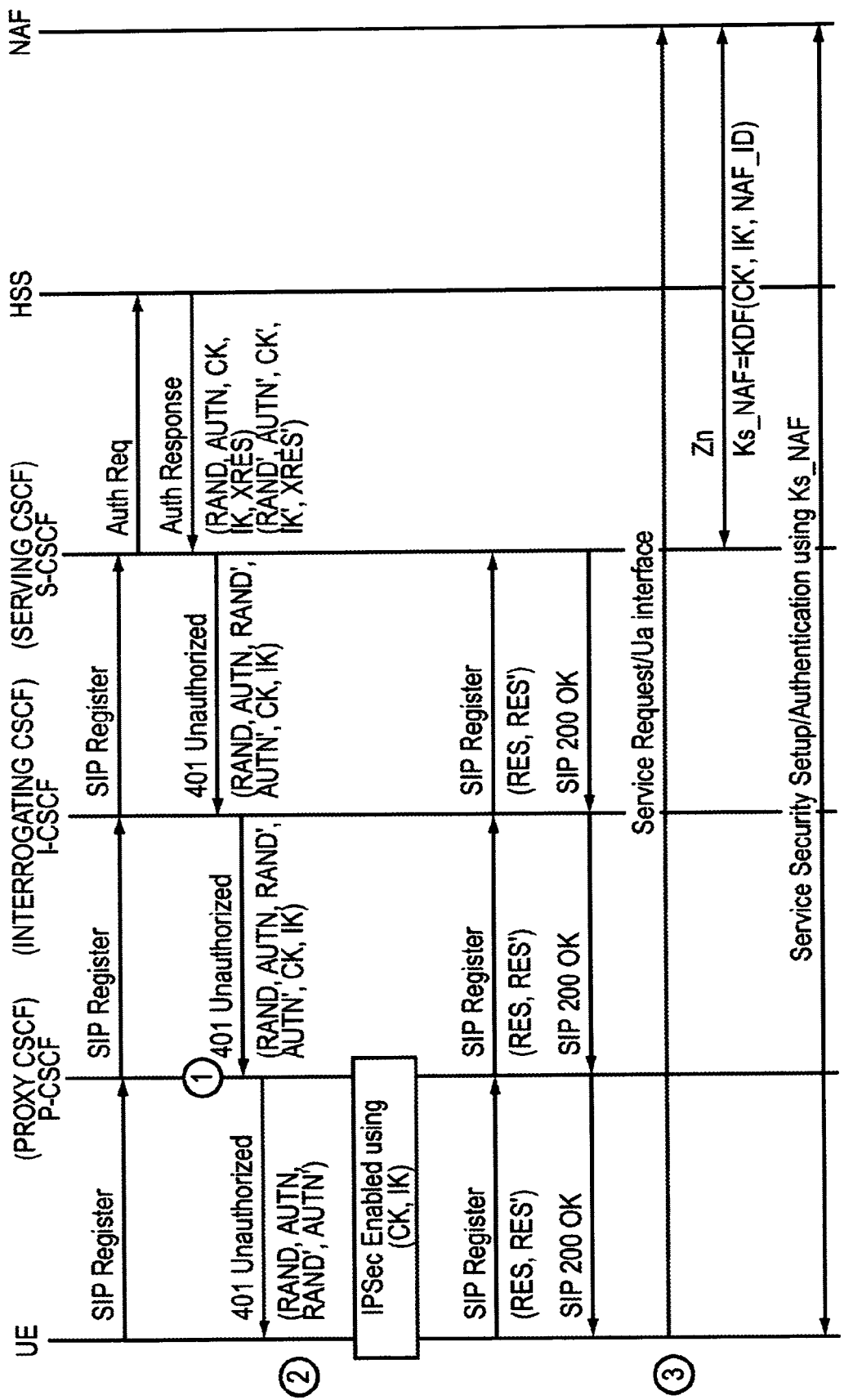
FIG. 5 is a call flow diagram of a conventional IMS-AKA authentication procedure.
Figure 6:
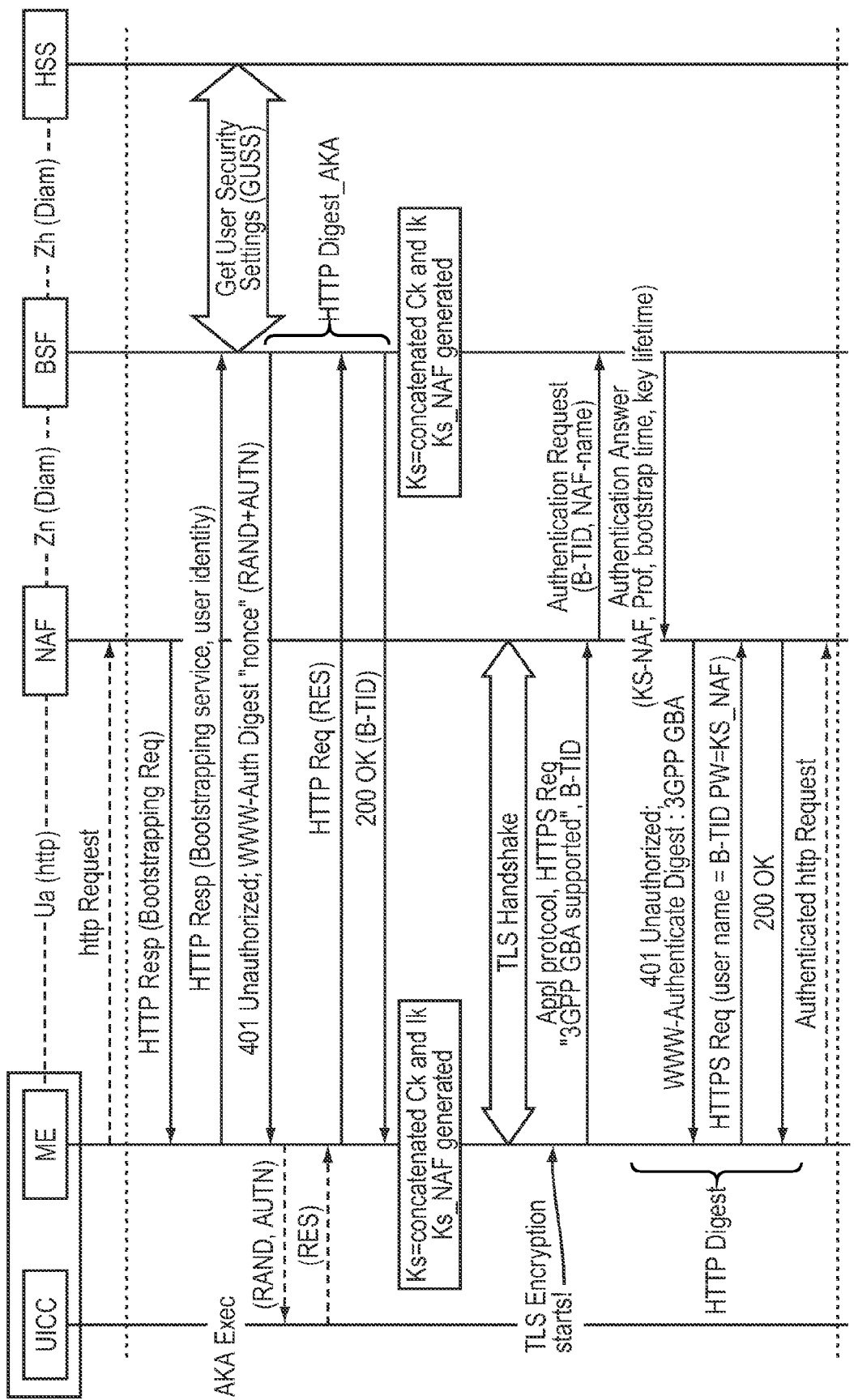
FIG. 6 is a call flow diagram of a conventional GBA-AKA authentication procedure.

Turning from the example circuit details, FIGS. 5 and 6 together illustrate conventional, independent (no sharing) IMS-AKA and GBA-AKA authentications for a given user terminal. Thus, as described and claimed herein, the terms "IMS-AKA authentication" and "GBA-AKA authentication" may, in at least one embodiment, have these illustrated processing steps as their basic framework, with one or more modifications regarding the sharing of authentication information between the S-CSCF 10 and the BSF 12. Other embodiments described and claimed herein depart more significantly from these basic authentication illustrations, but all such embodiments provide for IMS-AKA and GBA-AKA authentication of the user terminal 14, in the sense that they enable secure IMS-domain and secure GBA-domain accesses.

By performing independent, non-sharing IMA-AKA and GBA-AKA authentication procedures for a given user terminal, as is done with conventional IMS-domain and GBA-domain authentications, network operators incur unnecessary expense, both initially (capital) and ongoing (operating). For example, it will be increasingly common for an operator to deploy both IMS and GBA/GAA technologies for differing types of services, meaning that authentication inefficiencies will become increasingly problematic.

In a more detailed example of the inefficiency problem based on the TISPAN Security Architecture, one may assume that a user first accesses a GBA-based application, thereby triggering a GBA-AKA authentication procedure towards the user's HSS, via a supporting BSF. One may further assume that the same user later attempts to access an IMS-based application, thereby triggering an IMS-AKA authentication procedure towards the same HSS, via a supporting P/S-CSCF. These two authentications are somewhat duplicative and result in inefficient key management due to unnecessary authentication vector (AV) consumption at the HSS, and give rise to possible synchronization risks because of the duplicate (but non-correlated) authentication sessions in the S-CSCF and the BSF for the same user.

Notably, although these sessions are duplicative in some sense, they conventionally are completely independent, even though much of the session information is common to both. With that independence, changes in one session are not "noticed" or otherwise reflected in the other session. (Such changes are triggered by re-authentication, key refreshment, etc.) Further, the lack of any security information sharing between the IMS and GBA domains means that applications need to be IMS-aware and GBA-aware to be "reachable" through IMS-AKA based infrastructures and GBA-AKA based infrastructures. That requirements necessitates that applications implement two interfaces, i.e., an IMS/SIP interface and a GBA/NAF interface (using HTTP/Transport Layer Security), which undesirably increases initial and ongoing costs.

Figure 7:
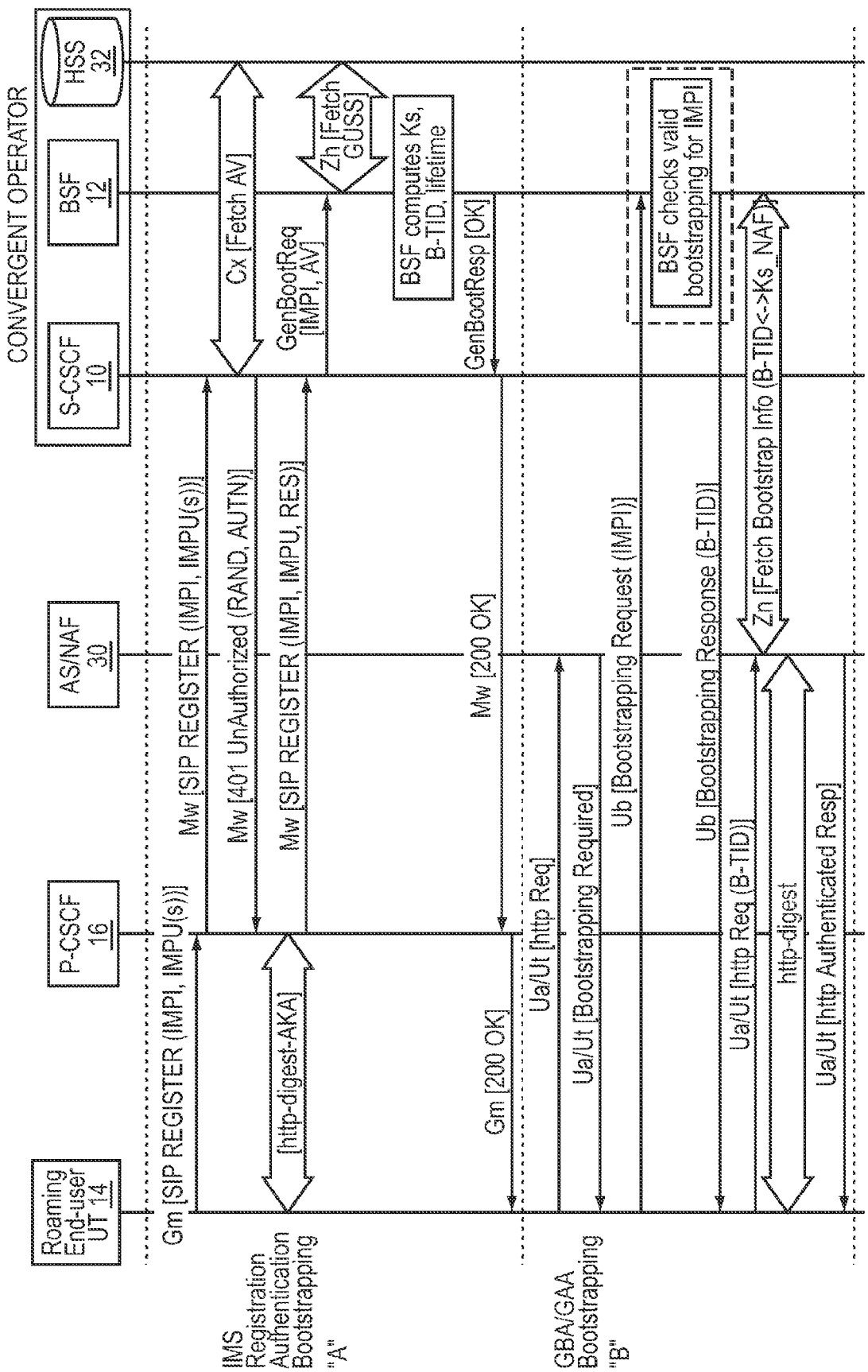
FIG. 7 is a call flow diagram of an IMS-AKA authentication procedure and a GBA-AKA authentication procedure, wherein user authentication information is shared between the two authentication procedures according to one embodiment of a method taught herein.

Turning then to exemplary methods and apparatus presented herein for linking or otherwise modifying the IMS-AKA and GBA-AKA authentication procedures for greater efficiency through authentication information sharing, FIG. 7 illustrates authentication information sharing between an IMS-AKA authentication procedure "A" and a subsequent GBA-AKA authentication procedure "B." This process flow is shown with reference to the entity designators used in FIG. 1.

As the diagram illustrates, the S-CSCF 10 and the BSF 12 are communicatively coupled together for authentication information sharing, such as through their respective interfaces 18 and 20. With this coupling, when the user terminal 14 triggers a successful IMS-AKA authentication (as part of IMS registration), the S-CSCF 10 sends a notification to the BSF 12. That notification includes, for example, the AKA vector obtained from the HSS 32 by the S-CSCF 10 for the IMS-AKA authentication of the user terminal 14.

In a complementary configuration, in response to receiving the notification, the BSF 12 can be configured to trigger a request to the HSS 32 for the user terminal's GBA User Security Settings (GUSS). The BSF 12 can then create the information needed for bootstrapping the user terminal 14 using the AKA vector from the S-CSCF 10 and the GUSS from the HSS 32. Doing so obviates the need for the HSS 32 to generate a new, independent AKA vector for the GBA-based bootstrapping.

Later, when the user terminal 14 attempts to access a GBA-based application, it requests authentication bootstrapping from the BSF 12. The BSF 12 is operative to detect that bootstrapping has already occurred for the user terminal 14 via authentication information sharing from the S-CSCF 10, and thus bypasses the bootstrapping process and directly returns the Bootstrapping Transaction Identifier (B-TID) to the user terminal 14. In turn, the user terminal uses the B-TID to establish a security association with the NAF 30, in accordance with GBA procedures.

Alternatively, it is not necessary for the BSF 12 to distribute the B-TID and, instead, the user terminal 14 can contact the NAF 30 directly. In that case, the user terminal 14 may be configured for B-TID generation. In any case, the above approach has a minimal impact on the standardized IMS interfaces towards the user terminal 14.

Figure 8:
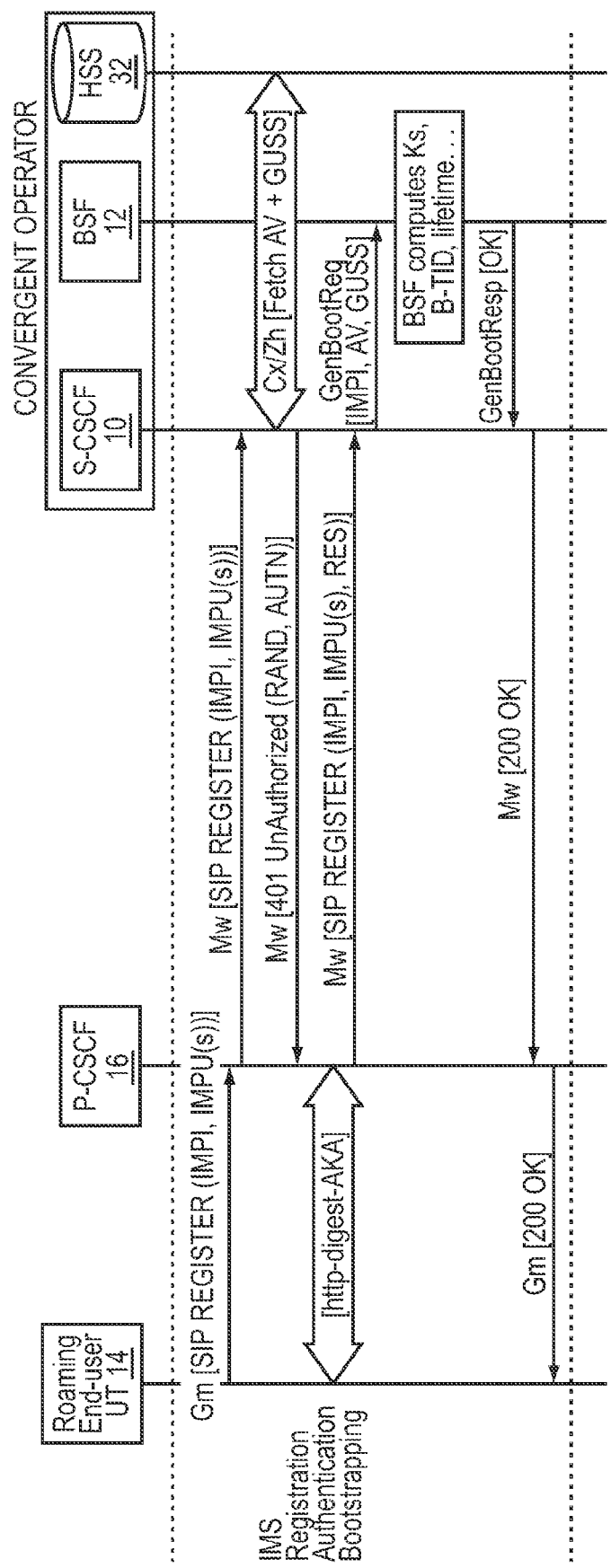
FIG. 8 is a call flow diagram of an IMS-AKA authentication procedure and a GBA-AKA authentication procedure, wherein user authentication information is shared between the two authentication procedures according to another embodiment of a method taught herein.
Figure 9:
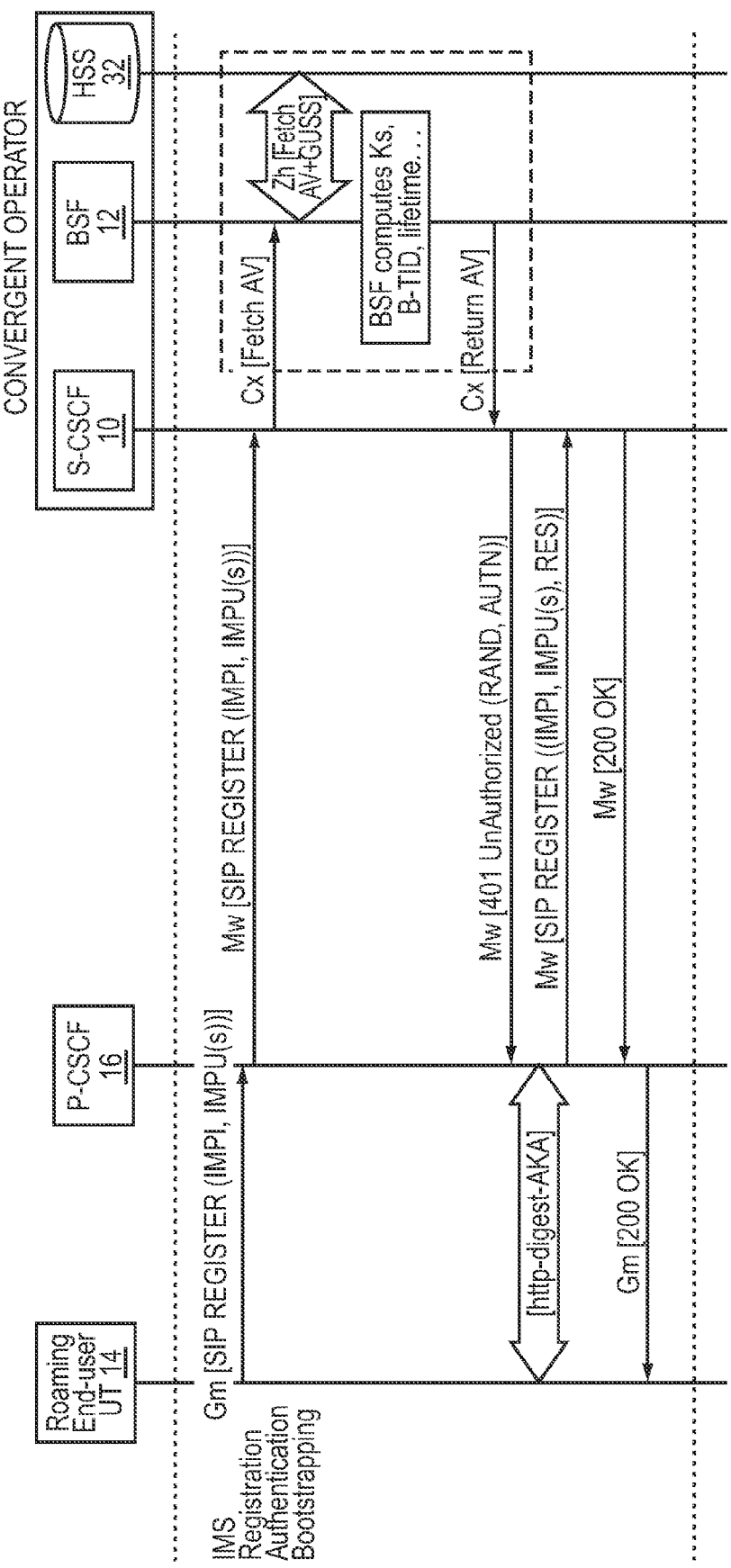
FIG. 9 is a call flow diagram of an IMS-AKA authentication procedure and a GBA-AKA authentication procedure, wherein user authentication information is shared between the two authentication procedures according to yet another embodiment of a method taught herein.

FIGS. 8 and 9 introduce additional embodiments for sharing user authentication information between the S-CSCF 10 and BSF 12, which avoid "extra" (redundant) accesses for IMS-AKA and GBA-AKA authentication of the same user terminal 14. More particularly, FIG. 8 illustrates that the S-CSCF 10 is configured to fetch the GUSS for the user terminal 14 as part of IMS registration, along with fetching the authentication vector (AKA vector) for the user terminal 14. That is, rather than simply obtaining an AKA vector from the HSS 32 for registering the user terminal 14 with the IMS network 28, the S-CSCF 10 is operative additionally to obtain the GUSS for the user terminal 14 from the HSS 32. Further, the S-CSCF 10 is operative to transfer the AKA vector and the GUSS for the user terminal 14 to the BSF 12, as shared user authentication information. The BSF 12 is operative to use the shared user authentication information to perform a normal bootstrapping procedure for the user terminal 14, except that it does not need to access the HSS 32 for the AKA vector or the GUSS, as those items are transferred to it from the S-CSCF via the interfaces 18 and 20.

The operations immediately above have, in some sense, more impact on the operation of the S-CSCF 10 than on the BSF 12. In some circumstances or implementations, it is more advantageous to impact operations at the BSF 12 more than at the S-CSCF 10. FIG. 9 illustrates one such embodiment, wherein the BSF 12 functions as a proxy for the HSS 32 with regard to the S-CSCF 10. More particularly, the BSF 12 in this embodiment is configured to work as transparent HSS-proxy towards the S-CSCF 10 in the "Cx" interface, as defined by the applicable 3GPP interface standards.

In such proxy embodiments, the AV request from the S-CSCF 10 in support of IMS registration of the user terminal 14 is "intercepted" by the BSF 12, or is otherwise directed to the BSF 12 in its role as proxy for the HSS 32. In response to the S-CSCF's request, the BSF 12 contacts the HSS 32, and obtains both the AV and the GUSS for the user terminal 14. Further, the BSF 12 uses these items to perform normal bootstrapping of the user terminal 14, as described above, and returns the AV to the S-CSCF 10 over, e.g., the Cx interface. While not limited to such contexts, the proxy embodiment may offer particular advantages where the BSF 12 is co-located with the HSS 32.

One of several advantages attending the above S-CSCF-BSF interface-based sharing of user authentication information is transparency regarding the user terminal 14. In other words, the authentication sharing between IMS-AKA and GBA-AKA security domains does not require awareness by or signaling support of the user terminal 14. While that lack of impact on the user terminal 14 may be advantageous, at least one embodiment herein contemplates further authentication efficiency based on user terminal signaling.

For example, in at least one embodiment, the user terminal 14 signals the BSF 12 that it has already been registered in the IMS network 28, i.e., that it has already undergone IMS-AKA authentication. In particular, at least one embodiment presented herein proposes that the user terminal 14 be configured so that it is operative to signal the BSF 12 that the user terminal 14 has already been registered in the IMS network 28. Such signaling is, in at least one embodiment, based on the B-TID.

On that point, in any the foregoing example embodiments, the BSF 12 can provide the B-TID for the user terminal 14 to the S-CSCF 10. The B-TID is then sent over the user (signaling) interface to the user terminal 14, i.e., in the IMS "200 OK" message shown in the call flows of FIGS. 7-9.

Figure 10:
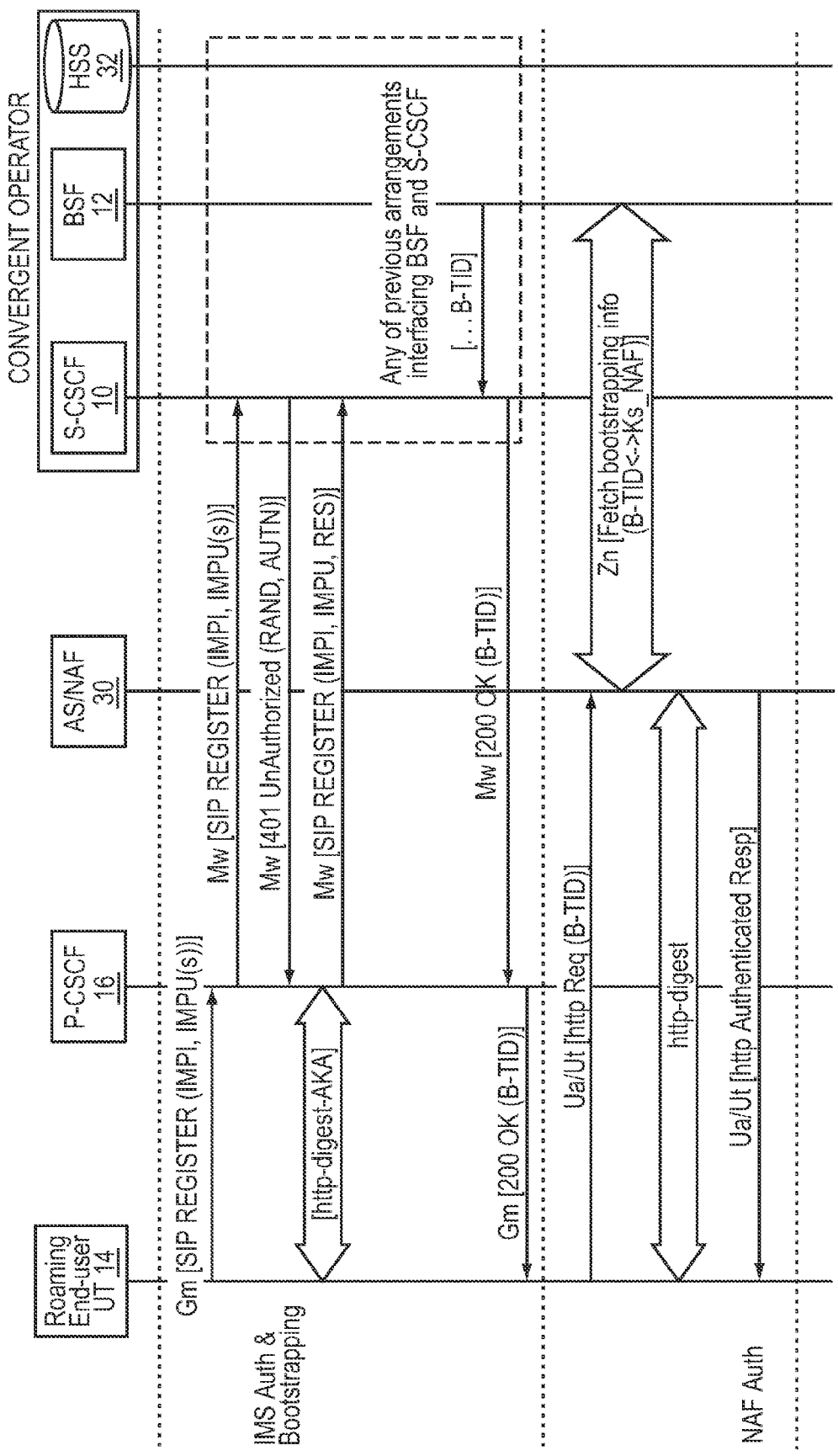
FIG. 10 is a call flow diagram of an IMS-AKA authentication procedure and a GBA-AKA authentication procedure, wherein user authentication information is shared between the two authentication procedures according to yet another embodiment of a method taught herein.

According to one or more embodiments contemplated herein, the user terminal 14 interprets receipt of that message as an indication that bootstrapping has already occurred, therefore obviating the need to contact the BSF 12. Thus, rather than contacting the BSF 12 for bootstrapping, the user terminal 14 contacts the NAF 30 directly, according to the GBA procedures. FIG. 10 illustrates one embodiment of such processing.

While this approach does require changes at the user terminal 14, it advantageously makes possible the linking of IMS-AKA authentication to GBA-AKA authentication, meaning that GBA-AKA authentication can be automatically bootstrapped (or completed) responsive to an IMS registration, with little or no impact on IMS registration.

For example, the user terminal 14 may be configured as an IMS-GBA "convergent" terminal, wherein it is configured to signal a flag or other indicator to the NAF 30, after the user terminal 14 undergoes IMS registration. In such embodiments, the flag indicates to the NAF 30 that the user terminal 14 has already undergone IMS-AKA authentication as part of IMS registration, and the user terminal 14 sends an IMPU (IP Multimedia PUblic key identity) instead of the not-yet-available B-TID. In turn, the NAF 30 is operative to use the IMPU as received from the user terminal 14 to contact the BSF 12, to fetch the corresponding bootstrapping information and the B-TID. After the HTTP digest, the NAF 30 sends the B-TID to the user terminal 14.

In another embodiment, the BSF 12 is configured so that it operates as a SIP AS, and thus becomes reachable using an IMS service identity. Accordingly, the user terminal 14 is configured to issue a SIP message to the BSF 12, e.g., a SIP "INVITE" message, to obtain the B-TID from the BSF 12, without need for any bootstrapping.

In still another embodiment, the NAF 30 is configured to behave as a SIP AS, with an assigned IMS service identity. With that configuration, the NAF 30 is reachable by the user terminal 14 using SIP signaling, and the user terminal 14 is, in one or more such embodiments, configured to send, e.g., a SIP INVITE to the NAF 30. Of course, such operations require IMS-AKA/GBA-AKA convergent operation at the user terminal 14, and require that the NAF 30 can obtain authentication key distributions.

Figure 11:
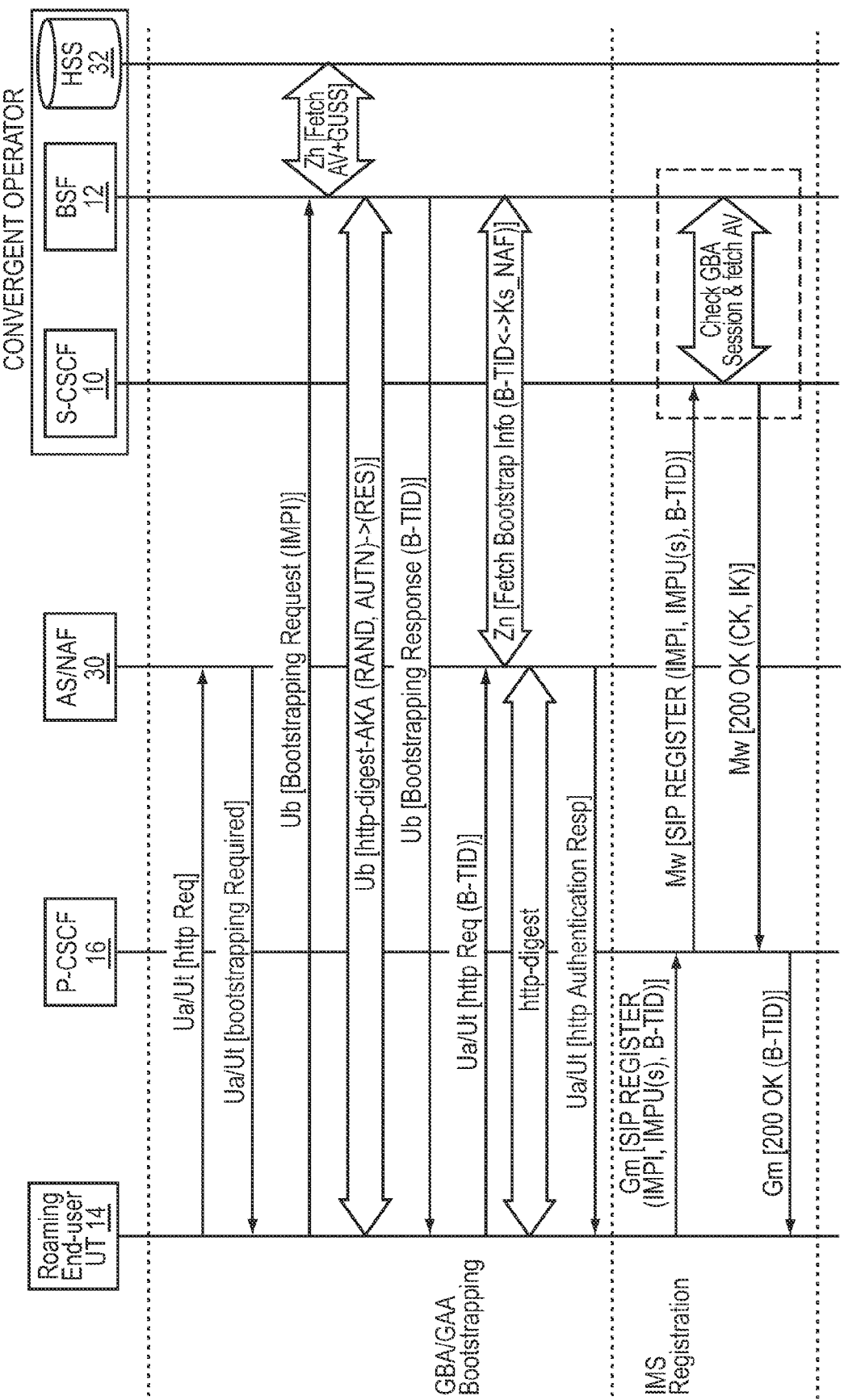
FIG. 11 is a call flow diagram of an IMS-AKA authentication procedure and a GBA-AKA authentication procedure, wherein user authentication information is shared between the two authentication procedures according to yet another embodiment of a method taught herein.

While FIGS. 7-10 illustrate examples where IMS registration occurs before the user terminal attempts to access a service requiring GBA-AKA authentication, those skilled in the art will appreciate that sharing of user authentication process can be triggered by or otherwise based on GBA-AKA authentication occurring first. FIG. 11 gives a non-limiting processing example for the case where the user terminal 14 first accesses a GBA-based application and then later access an IMS-based application.

In the illustration, one sees that the user terminal 14 can be configured to present the B-TID it has obtained by undergoing successful GBA bootstrapping as part of the IMS registration information. Thus, in one or more embodiments of the S-CSCF 10, it is operative to interpret the receipt of B-TID information from the user terminal 14 during IMS registration procedures as an indication that the user terminal has already undergone successful GBA-AKA authentication. The S-CSCF 10 thus contacts the BSF 12, to double check the bootstrapping information and to obtain the AV from the BSF 12. This process obviates the need for an explicit authentication of the user terminal 14 by the S-CSCF 10, and S-CSCF 10 simply would return an "OK" message to the user terminal 14.

Whether IMS-AKA authentication is first in time, followed by GBA-AKA authentication, or vice versa, the teachings herein provide methods and apparatuses for sharing user authentication information between an authentication entity in the IMS domain and an authentication entity in the GBA domain. Such sharing reduces or eliminates redundant authentication operations for IMS-AKA and GBA-AKA authentications of the same user terminal 14.

Still further, one or more embodiments of authentication information sharing contemplated herein include AKA vector derivation. For example, the S-CSCF 10 may obtain an AKA vector from the HSS 32, for IMS-AKA authentication. As taught earlier herein, the S-CSCF 10 may transfer the AKA vector to the BSF 12—i.e., send a copy—for use by the BSF 12 in GBA-AKA authentication. However, in one or more other embodiments, the S-CSCF 10 generates a derived AKA vector from the AKA vector obtained from the HSS 32, and transfers the derived AKA vector to the BSF 12 for its use in GBA-AKA authentication of the user terminal 14.

Use of a derived AKA vector enhances IMS-GBA domain separation, but still eliminates the need for the S-CSCF 10 and BSF 12 to obtain separate AKA authentication vectors from the HSS 32. Of course, variations of this technique may be practiced. For example, the S-CSCF 10 may transfer the AKA vector it obtained from the HSS 32 to the BSF 12, and then BSF 12 can be configured to generate the derived AKA vector. Further, the same technique can be applied going the other way. That is, the BSF 12 can obtain an AKA vector from the HSS 32 and then transfer that AKA vector to the S-CSCF 10, or it can transfer a derived AKA vector. If the S-CSCF 10 receives the HSS-generated AKA vector, it can use that directly for IMS-AKA authentication of the user terminal 14, or it can be configured to derive an AKA vector from the transferred vector.

In all cases, the user terminal 14 can be configured for complementary operation. That is, the user terminal 14 is in some sense "aware" of the vector sharing arrangement between the S-CSCF 10 and the BSF 12, and acts accordingly. If the S-CSCF 10 and BSF 12 use the same AKA vector for IMS-AKA authentication and GBA-AKA authentication, respectively, so too does the user terminal 14. Conversely, if one of the S-CSCF 10 and the BSF 12 uses the HSS-generated AKA vector and the other one uses a derived AKA vector, so too does the user terminal 14. In that regard, the user terminal 14 can be configured with the same vector derivation algorithm, such that it can generate the appropriate derived AKA vector for authentication, as needed.

Broadly, the teachings herein present a convergent IMS-core and GBA infrastructure arrangement that provide reutilization of authentication procedures, parameters and infrastructures between the IMS and GBA domains, thus reducing a network operator's CAPEX and OPEX. In one or more embodiments, such sharing is implemented via a convergent IMS core and 3GPP GBA infrastructure, with shared session management, efficient authentication, and key management. This approach reuses common authentication functions and components between the IMS and GBA domains. Supporting these functions and features, new interfaces between, for example, an IMS-domain S-CSCF 10 and a GBA-domain BSF 12, provide for the sharing of user authentication information.

With these broader points in mind, it should be understood that the foregoing description and the accompanying drawings represent non-limiting examples of the methods, systems, and individual apparatuses taught herein. As such, the present invention is not limited by the foregoing description and accompanying drawings. Instead, the present invention is limited only by the following claims and their legal equivalents.

What is claimed is:

1. A method of reducing redundant authentication operations for a user terminal, comprising:
    obtaining, by one of a Call Session Control Function (CSCF) that is used in Internet Protocol Multimedia Core Network Subsystem (IMS) Authentication and Key Agreement (AKA) authentication of the user terminal and a Bootstrapping Server Function (BSF) that is used in Generic Bootstrapping Architecture (GBA) AKA authentication of the user terminal, an AKA vector for the user terminal from a subscriber database;
    authenticating, by one of said CSCF and BSF, the user terminal using the AKA vector;
    sharing user authentication information comprising at least said AKA vector, or a derived AKA vector, for the user terminal between said CSCF and said BSF to enable the AKA vector to be used for both the IMS-AKA authentication and the GBA-AKA authentication, wherein sharing the user authentication information between the CSCF and the BSF comprises the CSCF communicating with the BSF as a Proxy for a Home Subscriber Server (HSS) and receiving the AKA vector from the HSS via the BSF, for the IMS-AKA authentication of the user terminal.

2. The method of claim 1, wherein sharing the user authentication information between the CSCF and the BSF comprises the CSCF obtaining the AKA vector from a Home Subscriber Server (HSS) for IMS-AKA authentication of the user terminal, and transferring the AKA vector to the BSF for GBA-AKA authentication of the user terminal.

3. The method of claim 2, wherein sharing the user authentication information between the CSCF and the BSF further comprises the CSCF obtaining Generic Bootstrapping Architecture User Security Settings (GUSS) from the HSS, and transferring the GUSS to the BSF, along with the AKA vector.

4. The method of claim 2, wherein transferring the AKA vector from the CSCF to the BSF comprises the CSCF automatically pushing the AKA vector to the BSF.

5. The method of claim 2, wherein transferring the AKA vector from the CSCF to the BSF comprises:
    the CSCF receiving a request from the BSF; and
    the CSCF sending the AKA vector to the BSF in response to the request.

6. The method of claim 1, wherein sharing the user authentication Information between the CSCF and the BSF comprises the CSCF obtaining the AKA vector from a Home Subscriber Server (HSS) for IMS-AKA authentication of the user terminal, generating a derived AKA vector from the AKA vector, and transferring the derived AKA vector to the BSF for GBA-AKA authentication of the user terminal.

7. The method of claim 1, wherein sharing the user authentication information between the CSCF and the BSF comprises the BSF obtaining the AKA vector from a Home Subscriber Server (HSS) for GBA-AKA authentication of the user terminal, and transferring the AKA vector from the BSF to the CSCF for IMS-AKA authentication of the user terminal.

8. The method of claim 1, wherein sharing the user authentication information between the CSCF and the BSF comprises the BSF obtaining the AKA vector from a Home Subscriber Server (HSS) for GBA-AKA authentication of the user terminal, generating a derived AKA vector from the AKA vector, and transferring the derived AKA vector from the BSF to the CSCF for IMS-AKA authentication of the user terminal.

9. The method of claim 1, further comprising:
    the BSF retaining the AKA vector obtained by the BSF from the HSS for the CSCF, and using the AKA vector at the BSF for GBA-AKA authentication of the user terminal.

10. The method of claim 1, wherein sharing the user authentication information between the CSCF and the BSF comprises the CSCF transferring at least a portion of authentication information obtained by the CSCF from a Home Subscriber Server (HSS) if IMS-AKA authentication of the user terminal occurs before GBA-AKA authentication of the user terminal, and comprises the BSF transferring at least a portion of authentication information obtained by the BSF from the HSS, if GBA-AKA authentication of the user terminal occurs before IMS-AKA authentication of the user terminal.

11. A Call Session Control Function (CSCF) operative to support Internet Protocol Multimedia Core Network Subsystem (IMS) Authentication and Key Agreement (AKA) authentication of a user terminal, said CSCF comprising:
    a processing circuit configured to perform IMS-AKA authentication of the user terminal using an Authentication and Key Agreement (AKA) vector; and
    a Bootstrapping Server Function (BSF) interface circuit, operative to share user authentication information between the CSCF and a BSF that is used for Generic Bootstrapping Architecture (GBA) AKA authentication of the user terminal to enable the AKA vector to be used for both the IMS-AKA authentication and the GBA-AKA authentication, wherein the authentication information comprises the AKA vector obtained by one of said CSCF and BSF from a subscriber database, or a derived AKA vector;
    wherein the CSCF is further operative to communicate with the BSF as a proxy for a Home Subscriber Server (HSS) to obtain the AKA vector from the HSS via the BSF interface, for the IMS-AKA authentication of the user terminal.

12. The CSCF of claim 11, wherein the CSCF is operative to retain an AKA vector obtained by the CSCF for an IMS-AKA authentication of the user terminal, and wherein the CSCF is operative, via the BSF interface, to transfer the AKA vector or a derived AKA vector to the BSF for subsequent use by the BSF in supporting a GBA-AKA authentication of the user terminal, thereby reducing generation of redundant authentication information for the GBA-AKA authentication of the user terminal.

13. The CSCF of claim 12, wherein the CSCF functions as a Serving CSCF (S-CSCF) and is operative to access a Home Subscriber Server (HSS) for an IMS-AKA authentication of the user terminal, and is operative to obtain an AKA vector from the HSS and to retain the AKA vector as at least part of the user authentication information for transfer to the BSF.

14. The CSCF of claim 13, wherein the CSCF is operative to obtain Generic Authentication Architecture User Security Settings (GUSS) from the HSS for the user terminal as part of an IMS-AKA authentication of the user terminal, and to retain the GUSS as at least part of the user authentication information for transfer to the BSF.

15. The CSCF of claim 11, wherein the CSCF is, via the BSF interface, operative to push the authentication information to the BSF responsive to an IMS-AKA authentication of the user terminal.

16. The CSCF of claim 11, wherein the CSCF is, via the BSF interface, operative to send the authentication information to the BSF responsive to the BSF requesting the authentication information from the CSCF.

17. The CSCF of claim 11, wherein the CSCF is operative to share user authentication information for the user terminal between the CSCF and the BSF based on receiving an AKA vector from the BSF via the BSF interface and use the received AKA vector for IMS-AKA authentication of the user terminal.

18. A Bootstrapping Server Function (BSF) operative to support Generic Bootstrapping Architecture (GBA) Authentication and Key Agreement (AKA) authentication of a user terminal, said BSF comprising:
- a processing circuit configured to perform GBA-AKA authentication of the user terminal using an Authentication and Key Agreement (AKA) vector; and
- a Call Session Control Function (CSCF) interface circuit, operative to share user authentication information between the BSF and a CSCF that is used for Internet Protocol Multimedia Core Network Subsystem (IMS) Authentication and Key Agreement (AKA) authentication of the user terminal to enable the AKA vector to be used for both the IMS-AKA authentication and the GBA-AKA authentication, wherein the authentication information comprises the AKA vector obtained by one of said CSCF and BSF from a subscriber database, or a derived AKA vector;
wherein the BSF is further operative to act, with respect to the CSCF, as a Proxy for a Home Subscriber Server (HSS) by receiving an authentication request from the CSCF via the CSCF interface, obtaining from the HSS the AKA vector on behalf of the CSCF and transferring the AKA vector to the CSCF via the CSCF interface.

19. The BSF of claim 18, wherein the BSF is operative to retain an AKA vector obtained by the BSF for a GBA-AKA authentication of the user terminal, and wherein the BSF is operative, via the CSCF interface, to transfer the AKA vector or a derived AKA vector to the CSCF for subsequent use by the CSCF in supporting an IMS-AKA authentication of the user terminal, thereby reducing generation of redundant authentication information for the IMS-AKA authentication of the user terminal.

20. The BSF of claim 19, wherein the BSF is operative to access a Home Subscriber Server (HSS) during the GBA-AKA authentication of the user terminal to the service layer network, and is operative to obtain an AKA vector from the HSS and to retain the AKA vector as at least part of the user authentication information for transfer to the CSCF.

21. The BSF of claim 19, wherein the BSF is operative to retain the AKA vector and the GUSS obtained from the HSS for use by the BSF in a GBA-AKA authentication of the user terminal.

22. The BSF of claim 19, wherein the BSF is operative to share user authentication information for the user terminal between the BSF the CSCF based on receiving an AKA vector from the CSCF via the CSCF Interface and using the received AKA vector for GBA-AKA authentication of the user terminal.

* * * * *